March 19, 1968   J. G. CROCKETT ET AL   3,374,010
COUPLEABLE CHASSIS
Filed May 6, 1966   8 Sheets-Sheet 1
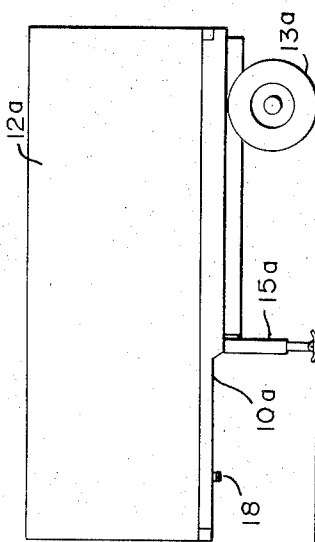
FIG. 1
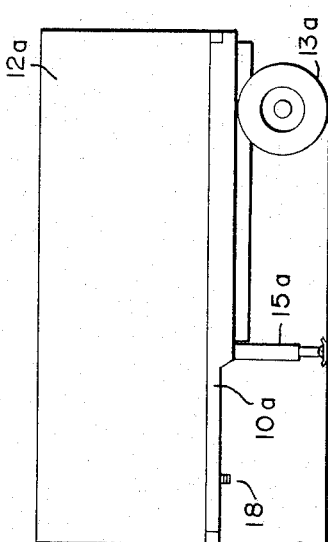
FIG. 2
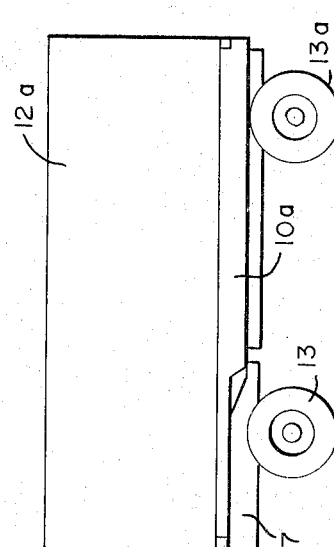
FIG. 3
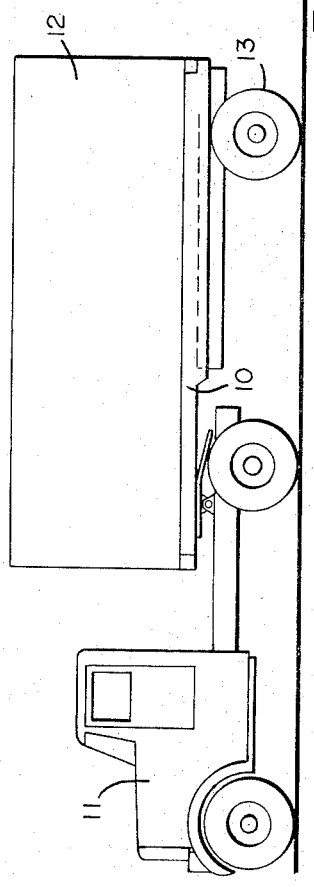
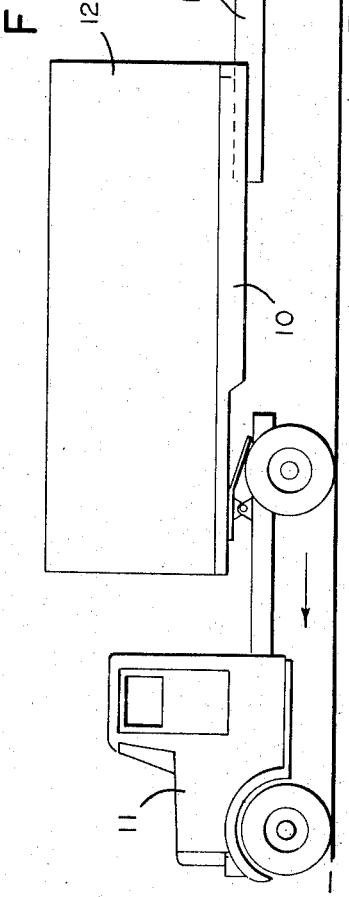
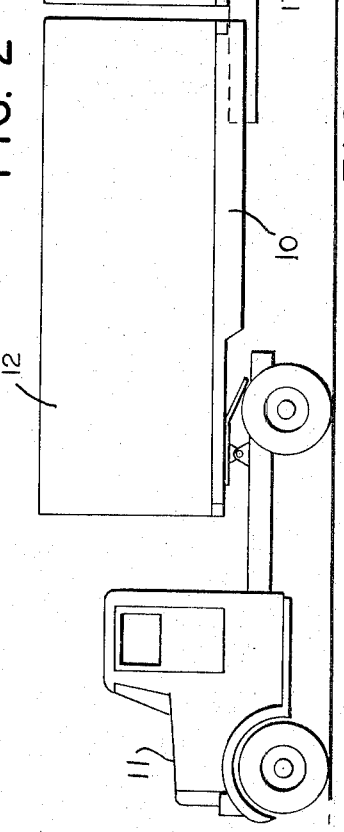
INVENTORS
JOSEPH G. CROCKETT
ROY C. BELCER
BY Weingarten,
Ourmbuch &
Lahive
ATTORNEYS March 19, 1968  J. G. CROCKETT ET AL  3,374,010
COUPLEABLE CHASSIS
Filed May 6, 1966  8 Sheets-Sheet 2

INVENTORS
JOSEPH G. CROCKETT
ROY C. BELCER
BY Weingarten,
Orenbuch &
Lahive
ATTORNEYS INVENTORS
JOSEPH G. CROCKETT
ROY C. BELCER
BY Weingarten,
Orenbuch &
Lahive
ATTORNEYS March 19, 1968 J. G. CROCKETT ET AL 3,374,010
COUPLEABLE CHASSIS
Filed May 6, 1966 8 Sheets-Sheet 4

INVENTORS
JOSEPH G. CROCKETT
ROY C. BELCER
BY Weingarten,
Orenbuch &
Lahive
ATTORNEYS INVENTORS
JOSEPH G. CROCKETT
ROY C. BELCER
BY Weingarten,
Orenbuch &
Lahive
ATTORNEYS

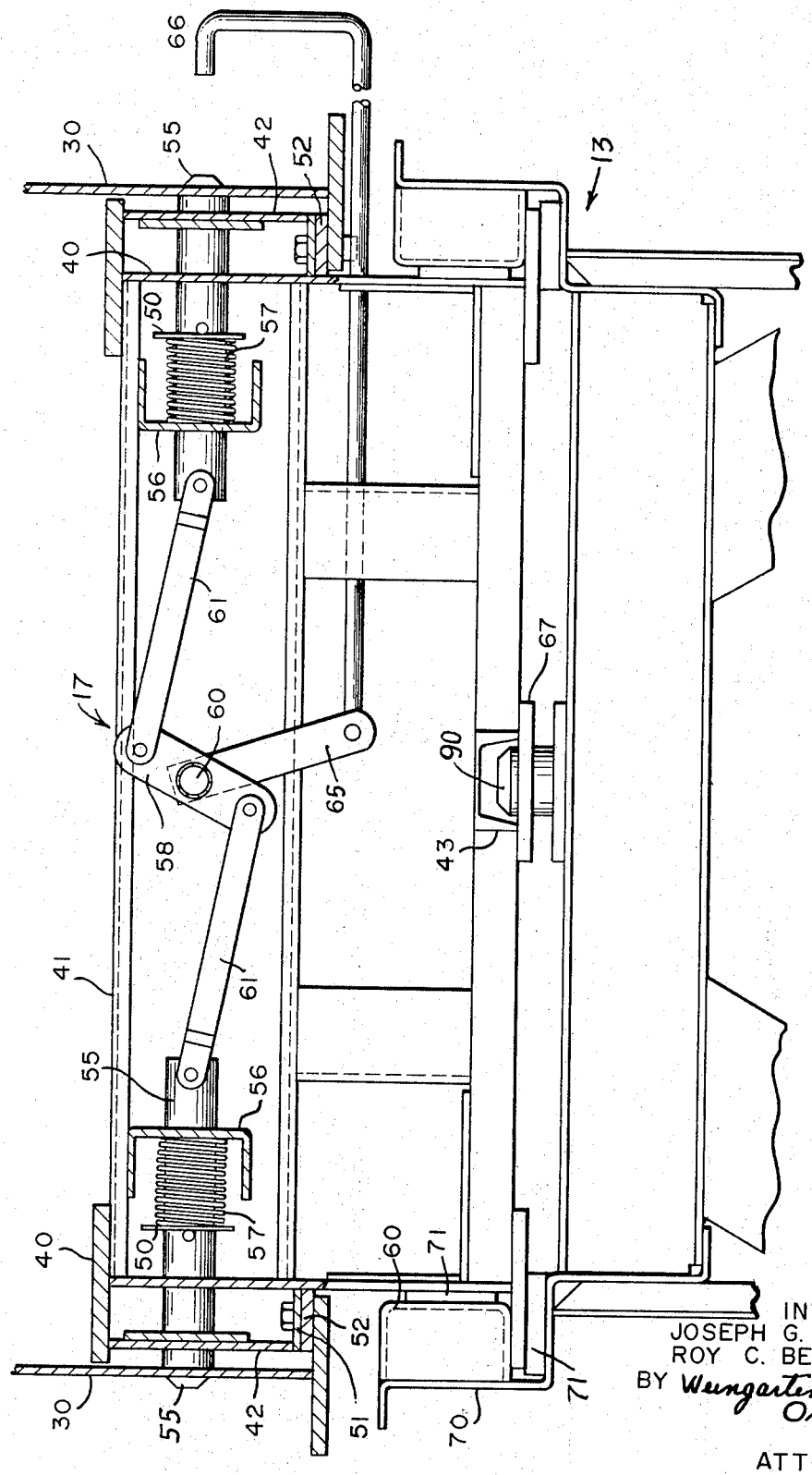

March 19, 1968 J. G. CROCKETT ET AL 3,374,010
COUPLEABLE CHASSIS
Filed May 6, 1966 8 Sheets-Sheet 7

INVENTORS
JOSEPH G. CROCKETT
ROY C. BELCER
BY Weingarten, Orenbuch & Lahive
ATTORNEYS

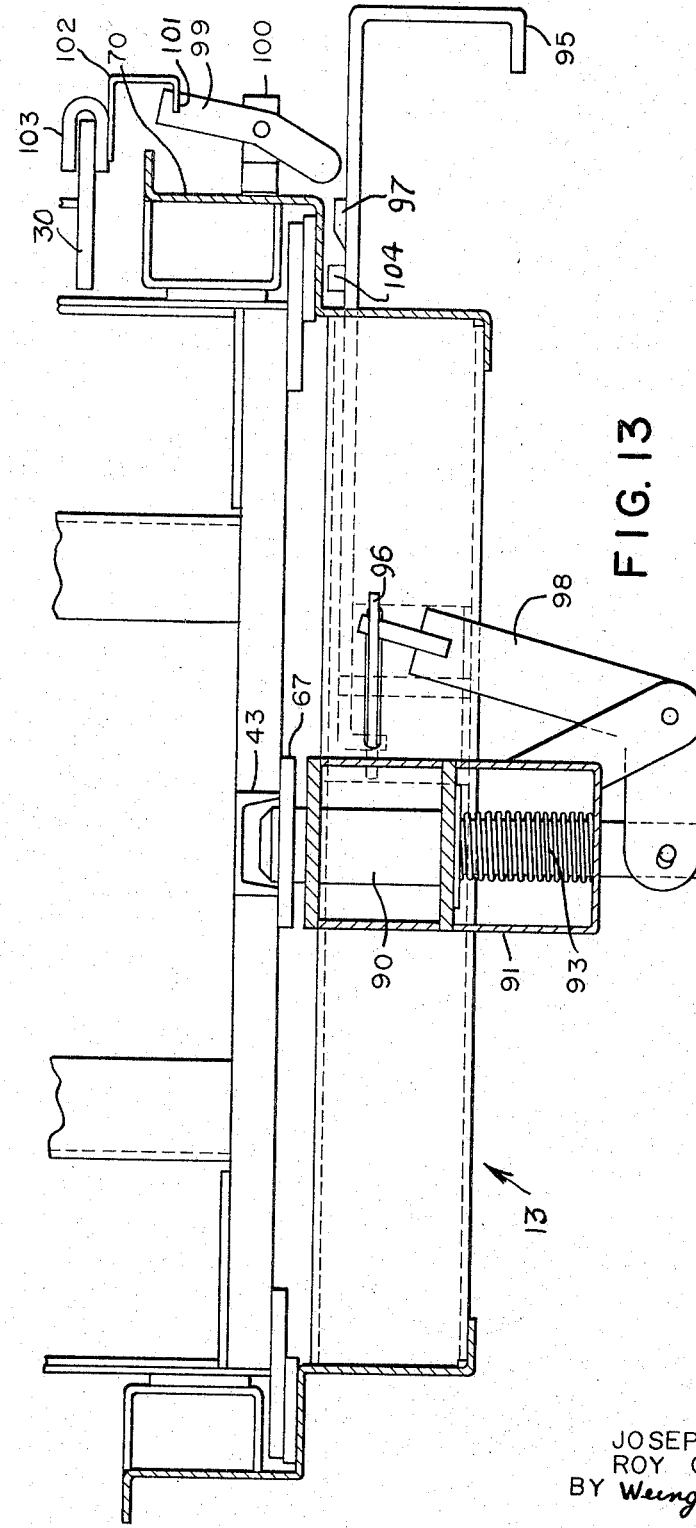

United States Patent Office 3,374,010
Patented Mar. 19, 1968

3,374,010
COUPLEABLE CHASSIS
Joseph G. Crockett, Lynnfield, Mass., and Roy C. Belcer, Opp, Ala., assignors of one-half to XTRA, Inc., Boston, Mass., a corporation of Massachusetts, and one-half to Dorsey Trailers, Inc., Elba, Ala., a corporation of Delaware
Filed May 6, 1966, Ser. No. 548,106
9 Claims. (Cl. 280—415)

ABSTRACT OF THE DISCLOSURE

A chassis module which may be used as an individual trailer unit coupled to a highway tractor or in tandem when longitudinally coupled with an identical module to form a double-length trailer. The tandem arrangement is accomplished by sliding a sub-chassis rearwardly from the chassis module to provide the fifth wheel for attachment of the second module. The modules are rigidly coupled longitudinally and the respective wheels of the module bogies are joined to provide a single load distributing bogie.

This invention relates in general to cargo transportation and more particularly to chassis for transporting cargo containers over land.

One of the recent innovations in the transportation of cargo has been the introduction of the container concept. Container cargo transportation involves the use of a standardized cargo module which is used in combination with a chassis for rail and over the road transportation and which may be detached from the chassis for rail or ocean transportation. The container is generally formed of relatively light weight metal panels with a particular frame and cornerplate structure to provide for ease of stacking in the cargo holds of ships and also for attachment by a standardized clamping arrangement to the chassis for land transportation. In general, the basic module is about twenty feet long by eight feet wide by eight feet high. While this module has been found to be a convenient size permitting reasonable flexibility in shipping arrangements, the usual highway tractor is capable of hauling two such containers in a tandem arrangement. Therefore, to provide maximum efficiency in the use of containers, a variety of designs have been proposed for coupling two container-chassis assemblies together for hauling by a single highway tractor.

One approach to this problem has involved the construction of a semi-trailer unit including a container where the containers are each formed so that they may be interlocked near the base of the container with the front end of one container butted firmly against the back end of the other container. In most instances the wheels and axle, referred to as a "bogie," from the front unit are arranged so that they may be moved in the joined arrangement to a position in front of the wheels of the rear trailer, forming what is known as a tandem suspension. This arrangement has, however, some drawbacks. The containers must be formed with sufficient structural strength so that the container itself can act as the structure for transmitting the load between the highway tractor and the rear unit. This usually involves a heavier construction than is necessary for the straight cargo carrying function and, while the container is being transported by rail or ocean, this extra structural strength is unnecessary. Additionally, under existing commercial regulations, a container used in this manner must carry its own brake, clearance and turn signalling lights. Again, when the container is not being employed in over the road transportation, these lights are not being used. Thus, under this system the container is made more expensive from both the structural and the equippage point of view.

A second approach to this problem has involved the use of specially designed chassis. In this arrangement one chassis is designed as a lead trailer and another as the following trailer. The lead trailer chassis is arranged to couple to the fifth wheel latch of the tractor and the following trailer chassis is arranged to interlock with a special coupling arrangement on the rear of the lead trailer chassis. In addition to this coupling between the chassis, the containers are also latched together in this arrangement. One drawback of this design is the necessity of two entirely different types of trailers and the resultant limitations on flexibility in use of the modules.

It is therefore a primary object of the present invention to provide, for container transport, a chassis which may be used as either the lead or following unit in a tandem hook-up in which the two chassis become the load bearing structure instead of the containers.

It is another object of the present invention to provide a semi-trailer module for use as either an individual trailer unit or as part of a tandem trailer unit where the units may be arranged in tandem readily in a truck yard operation and where the tandem trailer arrangement includes a load equalizing double bogie under the rear section of the joined semi-trailers.

Broadly speaking, the chassis of this invention consists of a trailer chassis having at its front end the usual fifth wheel plate and king pin attachment for coupling to a fifth wheel latch on a highway tractor. The chassis includes within it a slidable sub-chassis which is normally locked in position within the main portion of the chassis. This sub-chassis may, upon unlocking, be extended to the rear of the main body of the chassis and locked also in this extended position. The sub-chassis carries on it a fifth wheel latching arrangement identical with the latching arrangement on a highway tractor and thus when this sub-chassis is extended, two of these trailer modules may be joined by this latch, in the same fashion as the semi-trailer is coupled to the highway tractor. Each trailer also includes a pair of tapered guides on the extendible sub-chassis which engage appropriately shaped parts on the front of the fixed part of the frame. On joining two trailers together the tapered guides are vertically and laterally restrained by bracing members on the front of the following trailer thereby effecting a longitudinal rigidity which is not provided by the fifth wheel coupling mechanism. The bogie for each trailer is slidably mounted within the extendible sub-chassis of the trailer and is normally locked in place when the trailer is used as a single unit. The chassis are arranged so that when two chassis are joined together to form a rigid double chassis trailer, the bogie on the front trailer may be unlocked and slid to the rear, locking in position just in front of the bogie on the rear trailer to form a tandem suspension. Each bogie includes a load equalizing feature so that upon even a highly irregular road surface the load between these bogies is equalized.

Other objects and advantages will become apparent from the following details and description when taken in conjunction with the accompanying drawing in which:

FIGS. 1 through 4 are side elevational views of a highway tractor and two modules illustrating the sequential steps involved in joining two modules to form a single tandem semi-trailer;

FIG. 9 is a cross-sectional view taken along the line 9—9 of FIG. 8 and further illustrates a portion of the wheel carriage positioned to show its cooperation with the extendible sub-chassis;

FIG. 10 shows the detail of a bumper assembly for use with the chassis of this invention;

FIG. 13 is a cross-sectional view of the wheel bogie carriage taken along the line 13—13 of FIG. 11.

Figure 4:
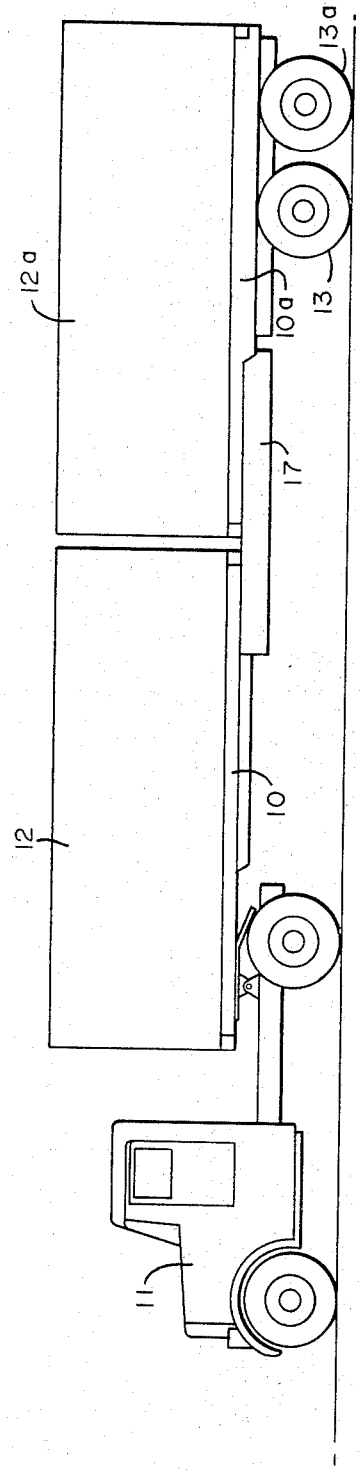

Referring now to FIGS. 1 through 4, the sequence of coupling a highway tractor with a single trailer module attached to it to a second trailer module to form a unified tandem trailer is illustrated. In FIG. 1, a highway tractor 11 has coupled to it a chassis 10 carrying a cargo container 12. A second chassis 10a is shown detached and supported upon its landing gear 15a and bogie 13a. The chassis 10a is identical with the chassis 10, however in FIG. 1 the landing gear of chassis 10 is folded up and hence not visible. The initial step in the coupling operation is shown in FIG. 2. The extendible portion 17 of chassis 10 is unlatched and the brakes on bogie 13 of chassis 10 are set. The tractor 11 is then driven forward which extends the extendible portion 17 until it reaches a second lock position as shown in FIG. 2. Upon completion of this step the brakes on bogie 13 are released and the tractor 11 and chassis 10 with its extended portion are backed under the front end of chassis 10a until the fifth wheel king pin 18 of chassis 10a engages the fifth wheel latching section 19 of chassis 10. When the king pin is located all the way forward in the latched position within the latching section 19, the chassis are in the position shown in FIG. 3. The landing gear 15a on the rear chassis 10a has now been swung up out of the way. It should be noted that in the position shown in FIG. 3 the cargo containers 12 and 12a remain a few inches apart and the bogie 13 of the front chassis 10 remains fixed to the expendible portion 17 of that chassis. The air lines from the tractor 11 which control the brakes of bogie 13 are now disconnected leaving the brakes of bogie 13 in a locked on position. The air lines to bogie 13a are now connected to tractor 11 so that the brakes on bogie 13a may be released. The locking pin which holds the bogie 13 fixed in position on extendible portion 17 is now unlocked. The final step in the coupling is shown in FIG. 4 and is accomplished by driving the tractor 11 coupled to the chassis 10 and 10a forward with the brakes set on bogie 13 and the brakes off on bogie 13a. Since the bogie 13 is no longer locked to the extendible section 17 of chassis 10, then the entire tractor and chassis move forward with respect to bogie 13 until this bogie reaches a position directly in front of bogie 13a. At this point the locking pin automatically engages in a locking position for the tandem arrangement. The final structure as shown in FIG. 4 is a rigid structure not only in terms of vertical load but also in terms of lateral forces, since the pair of guide elements 20 at the rear of the extendible portion 17 engage at the same time that the fifth wheel latching mechanism engages.

Structurally, the novel chassis of this invention is formed of the main chassis generally designated 10 in FIGS. 1 through 4, an extendible sub-chassis generally designated 17 and a wheel bogie assembly 13 which is movably mounted within the extendible sub-chassis 17. For clarity in the description of this novel chassis module the main chassis and each of these two sub-units will be described separately.

The main chassis

Figure 5:
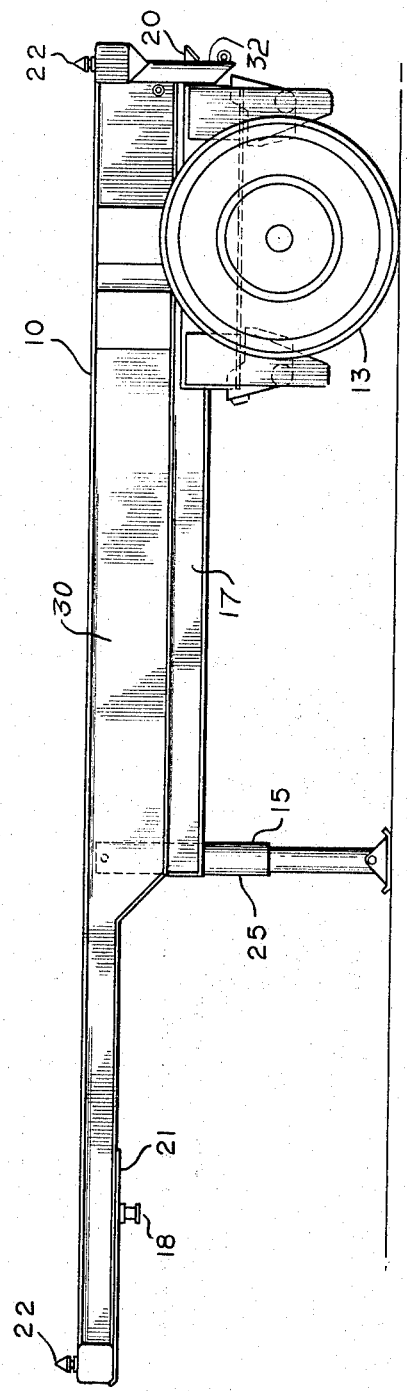
FIG. 5 is a side elevational view of a chassis module constructed in accordance with the principles of this invention.
Figure 6:
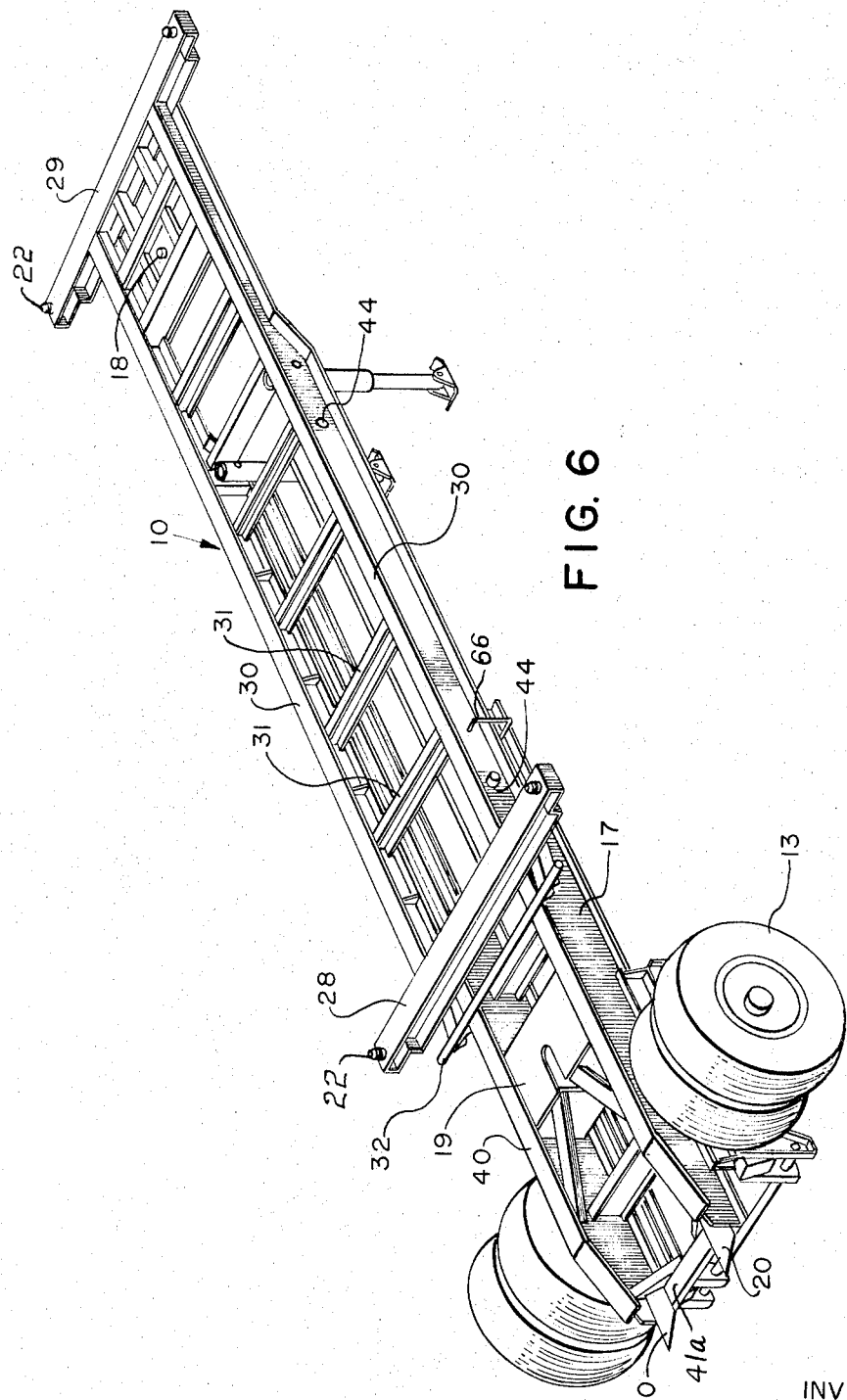
FIG. 6 is a perspective view of the chassis of this invention with the sub-chassis in its extended position.

FIGS. 5 and 6 present respectively a side elevational view and a perspective view of the chassis 10. In FIG. 5 the extendible sub-chassis 17 is telescoped within the frame of the main chassis 10 while in FIG. 6 this sub-chassis 17 is shown in an extended position. The main chassis is formed of a pair of longitudinally extending I beams 30 braced by a series of cross members 31. A rear bolster 28 extends laterally beyond the pair of I beam rails 30, as does a front bolster 29. Each of the bolsters 28 and 29 carry at either end conventional latching bolts 22 for securing a container to the chassis. For about one-third of the distance back from the front bolster the side rails 30 are reduced in height. In this area the fifth wheel plate 21 is supported, and from it extends the fifth wheel king pin 18. It is at this same area that the guide members 20 of the sub-chassis engage the main chassis 10 when a pair of chassis are joined in tandem. The main chassis also includes the landing gear 15 which consists of a pair of cylindrical posts 25 pivotally mounted to the chassis near the point where the vertical reduction in the rail 30 occurs. This landing gear is of conventional design and may be folded up into a secured position when the chassis 10 is coupled either to the fifth wheel mechanism of a tractor 11 or to another chassis module to form a tandem arrangement. At the rear of the main chassis 10 a pivoting bumper assembly 32 is mounted to protect the rear of the chassis while on the road. The detailed construction of this bumper assembly will be described in conjunction with the description of FIG. 10.

Extendible sub-chassis

Figure 7:
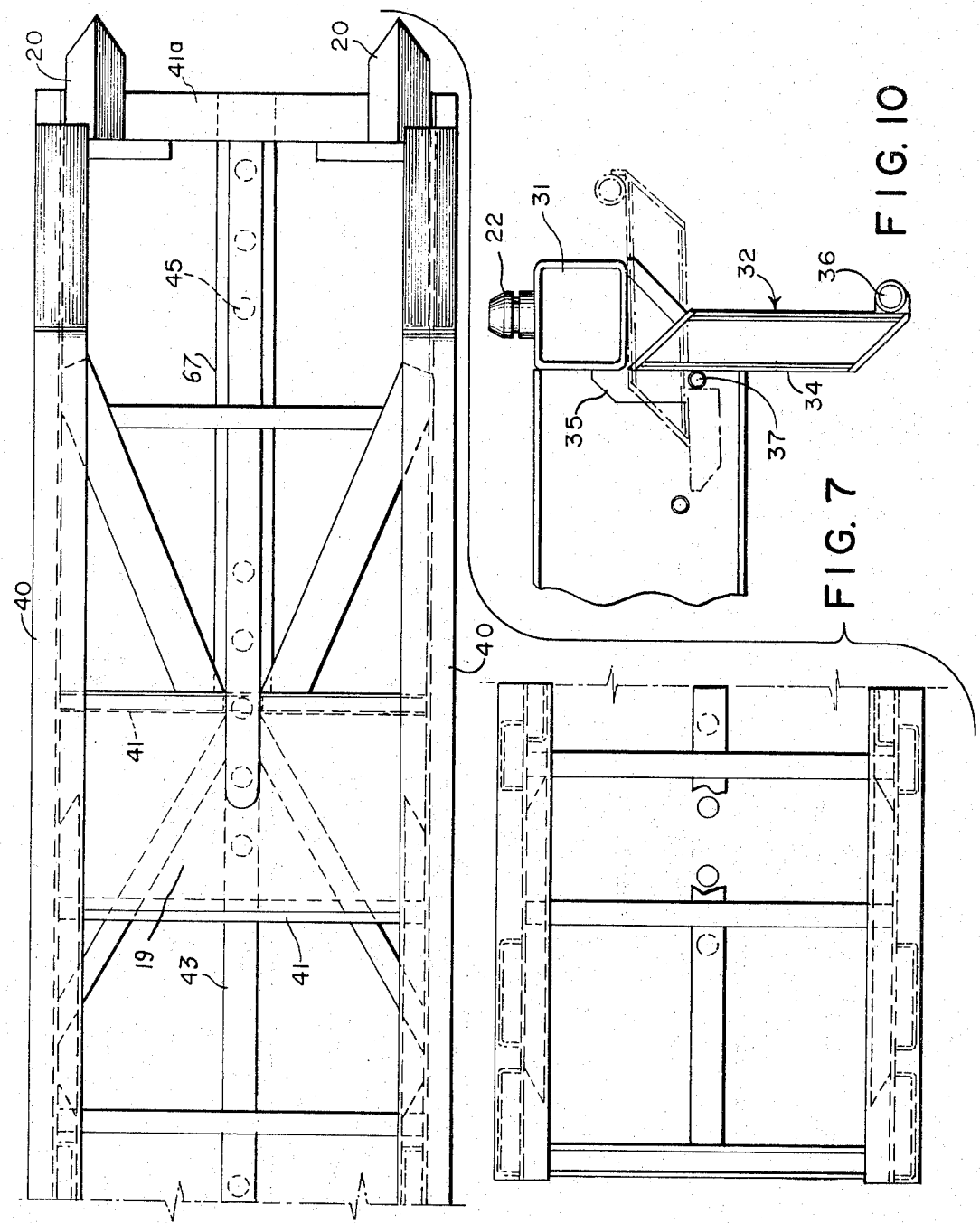
FIG. 7 is a plan view of the extendible sub-chassis which forms an integral part of the chassis module.

The extendible sub-chassis 17 is carried within the main chassis 10 slidably mounted on the longitudinal rails 30. This sub-chassis 17 is shown in plan view in FIG. 7 and details of its may also be seen in FIG. 6, FIG. 8 and FIG. 9. The sub-chassis 17 is a generally rectangular frame formed of longitudinal side rails 40 joined by a series of cross braces 41. Each of the side rails 40 is an I beam which has welded to its upper outside surface a right angle member 42 as shown in FIG. 9. Fastened to the bottom surface 51 of this angle member 42 is a phenolic pad 52 which serves as a sliding surface for sliding the sub-chassis 17 along the outer rails 30 of the main chassis 10. A steel channel 43 extends longitudinally down the center of the sub-chassis 17 and this channel has welded along its open bottom side a covering plate 67. The plate 67 has a series of circular openings 45 in it at positions corresponding to appropriate locations for the bogie carriage 13. At the rear of the sub-chassis 17 a pair of hollow triangular tapered guide members 20 are fastened to the lower part of the rearmost cross brace 41a. Also at the rear of the sub-chassis 17 is a standard fifth wheel latching mechanism 19 which provides for the guiding of a king pin attached to a fifth wheel plate on a trailer to be coupled to this extendible chassis and for the locking into position of this king pin when it is all the way forward in the latching area 19.

Figure 8:
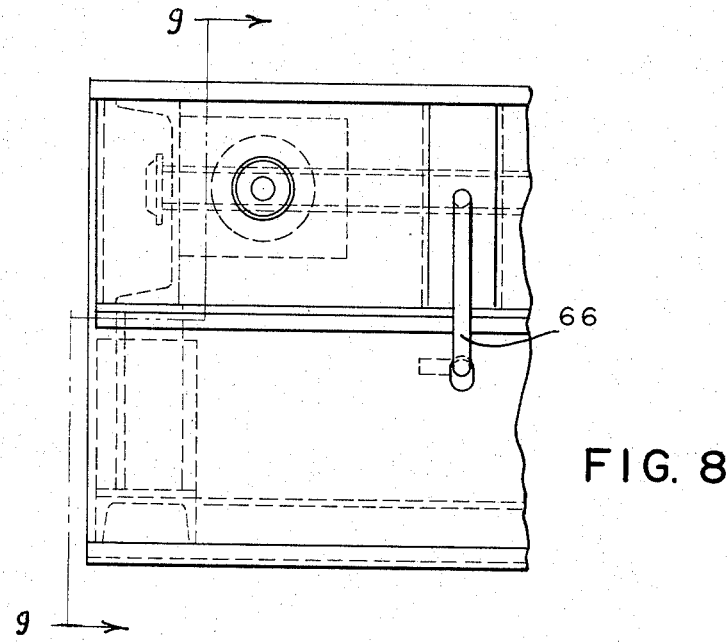
FIG. 8 is a side elevational view of the front portion of the sub-chassis illustrated in FIG. 7 mounted within the main chassis.

FIG. 8 shows a side elevation view of the front portion of the sub-chassis 17 mounted within the main chassis 10. FIG. 9 shows a cross-sectional view taken along the line 9—9 of FIG. 8. Together the two figures illustrate in detail the locking mechanism which provides for locking the sub-chassis 17 within the main chassis frame 10 in either its forward or its extended position. The locking mechanism consists of a pair of pins 55 slidably mounted for movement transverse to the longitudinal axis of the sub-chassis 17. Each pin 55 is mounted in circular openings cut through the plate 42, the face of I beam 40 and a bracket 56, which is fastened to one of the cross members 41 of the sub-chassis 17. A helical spring 57 mounted concentrically around the pin 55 between the bracket 56 and a flange 50 on the pin, exerts a force to keep the pin 55 normally extended in its outermost position. In this position the pin 55 protrudes through openings 44 in the side rails 30 of the main chassis 10. The pins 55 are connected by connecting links 61 to a crank 58 which is in turn fixed to rotate with a pivot bar 60. The pivot bar 60 is a pipe supported longitudinally within the frame 17 on a pair of vertical straps (not shown). A lever arm 65 has one end fixed to pivot bar 60 and the other end has connected to it a connecting rod 66 which extends beyond the side rails 30 of the main chassis. Pulling the connecting rod 66 then rotates the pivot bar 60 and hence the crank 58, which acts to withdraw both pins 55 against the action of springs 57 thereby freeing the sub-chassis frame 17 and allowing it to slide on the phenolic pad 52 along the side rails 30 of the main chassis 10.

*The wheel bogie*

As previously described, the wheel bogie 13 is mounted within the extendible sub-chassis 17 and this wheel bogie is latched in position but, upon being unlatched, it may be slid, not only along the frame of the sub-chassis 17, but also along the frame of an adjoining overall chassis module and into a position on the adjoining module sub-chassis adjacent to its wheel bogie. The wheel bogie 13 and its locking mechanism are illustrated in FIG. 9, FIG. 11, FIG. 12 and FIG. 13. The bogie is formed of four hangers 74 attached to a rectangular frame formed of side rails 70 and cross members 78, 77 and 79. The side rails 70 are formed generally with a horizontally offset portion so that the upper part of the rail serves as a slider for the bogie assembly along the I beams 40 of the extendible sub-chassis 17. For this purpose the side rails 70 have attached to their upper inner surfaces channel members 60 which in turn have fixed to their inner faces phenolic pads 71. An additional phenolic pad 71 is fastened to the upper surface of the offset in the side rail 70 and these two pads 71 provide a bearing surface for sliding the bogie along the side rails 40 of the sub-chassis 17. Additional structural support for the rectangular frame of the bogie 13 is provided by pipe struts 80.

Pivotally mounted on each of the hangers 74 are tilting spring support plates 82 which support the carriage type springs 84 carrying the axle 85 of the bogie. The axle 85 carries, of course, two sets of wheels 86. The bogie is held locked in position within the sub-chassis 17 by means of a locking pin 90 which is supported in a bracket 91 attached between the cross members 77 and 78 of the bogie. A helical spring 93 acts to normally urge this locking pin 90 in an upward vertical direction. When the bogie is fixed in position the locking pin 90 protrudes through one of the openings 45 in the cover plate 67 of the central channel 43 of the sub-chassis 17. In order to release this lock a pull rod 95 which protrudes beyond the bogie side rails 70 is pulled, thereby pivoting toggle link 96 which is coupled through bell crank 98 to the pin 90. It should be noted that the rod 95 carries on it a release bar 97. Additionally fixed to the side rail 70 of the bogie just above the rod 95 is a tilt lever 99 pivoted on a bracket 100. Actuation of the pull rod 95, after slight clockwise rotation (manual) of tilt lever 99, places rod 95 in its outward position where it may be held by suitable means to maintain the lock pin 90 in its downward position thus preventing it from entering any one of the openings 45. In order to actuate this lock pin a cam 102 mounted on a clamp 103 can be positioned anywhere along the bottom flange of the I beam 30 of the main trailer chassis 10. This cam 102 has a triangular cam surface 101 such that the tilt lever 99, upon coming in contact with it, is pivoted so that its upper part is thrust towards the side rail 70 and the rounded lower end pushes against the beveled surface of bar 97, thus releasing the push rod 95 and allowing the lock pin 90 to be urged upward. By positioning the clamp 103 at a location corresponding to the appropriate one of the openings 45, lock pin 90 is automatically locked into the new position when tilt lever 99 reaches this location. It will be observed that the function of block 104 is to prevent tilt lever 99 from pivoting out of the path of cam surface 101.

Figure 14:
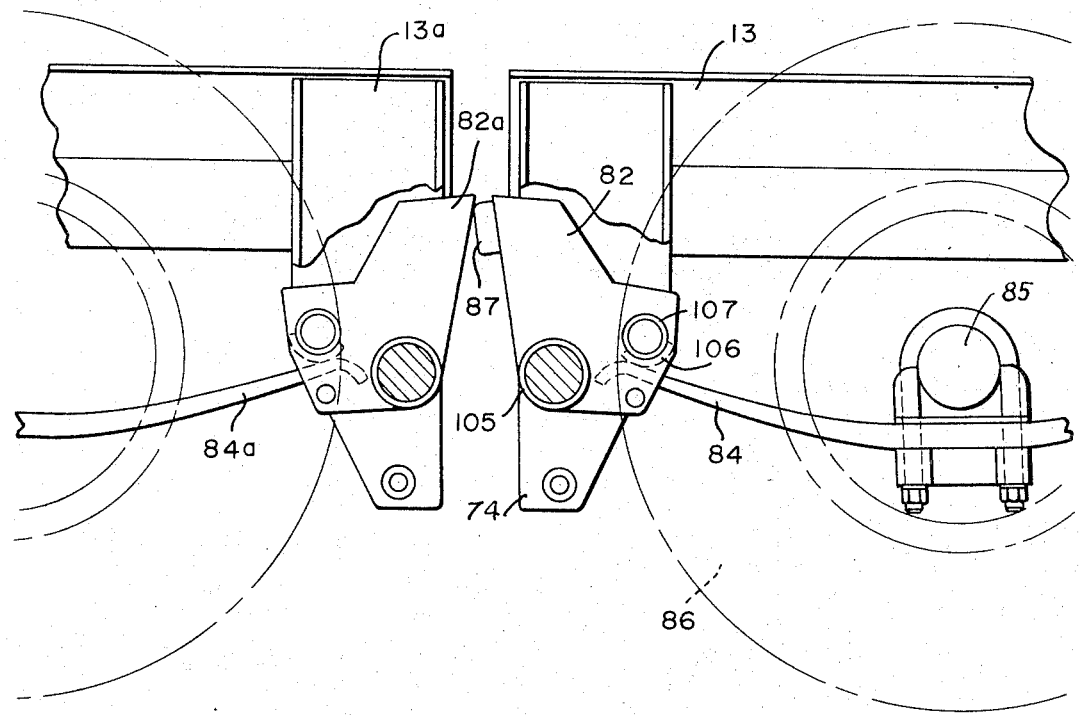
FIG. 14 is a side elevational view of a pair of wheel bogies arranged in tandem suspension with portions of the hangers broken away to show details of the construction.
Figure 11:
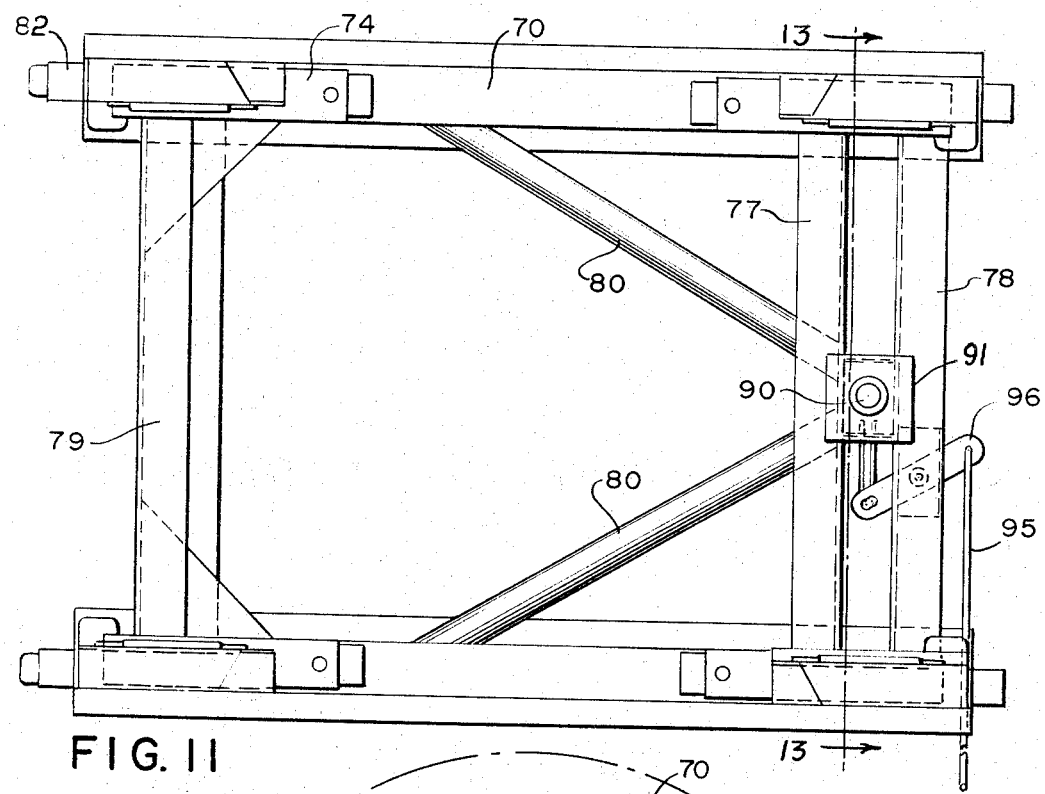
FIG. 11 is a plan view of the wheel bogie carriage which forms a part of the chassis of this invention.
Figure 12:
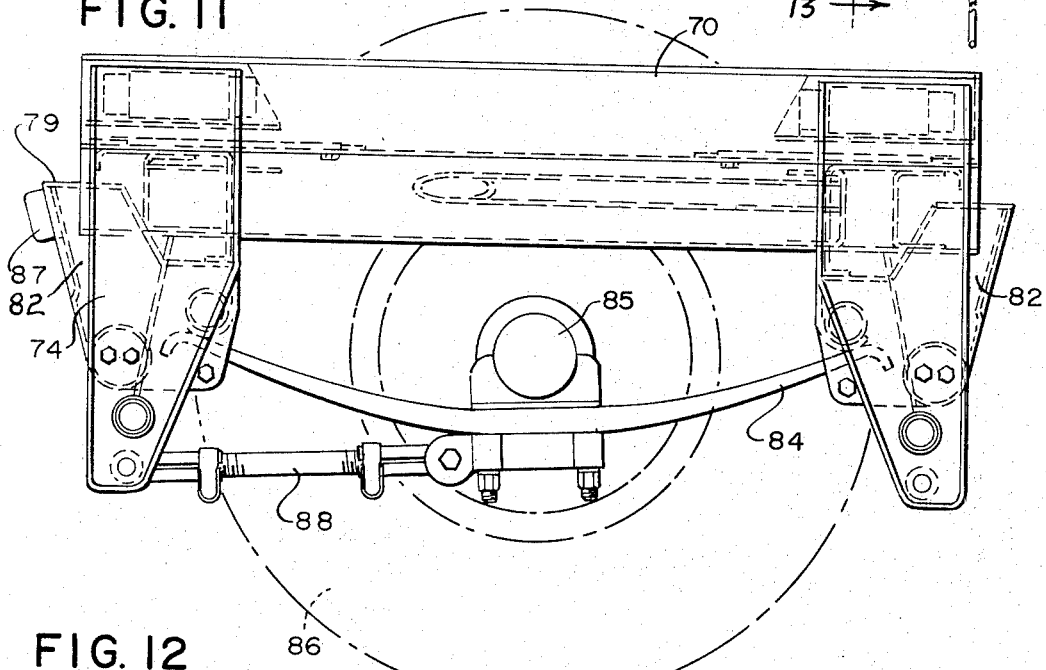
FIG. 12 is a side elevational view of the wheel bogie carriage of FIG. 11.

The bogie construction is such that it provides for load equalization when two bogies are butted against each other in a tandem suspension. This feature is most clearly shown in FIGS. 12 and 14. A tilt plate 82 is pivotally mounted on a bushing 105 on each one of the hangers 74. The carriage spring 84 is attached at each end to a collar section 106, which in turn is fastened to a rotating bushing 107 in another portion of the corresponding tilt plate 82. With this arrangement an upward thrust against the axle 85 tends to rotate the tilt plate 82 in a direction away from the axle 85. Each of the front tilt plates 82 carry on their outer edge a phenolic pad 87 and when the tilt plate is rotated by the action of the spring 84, this pad 87 strikes against the protruding surface of the adjacent tilt plate 82a of the other bogie, thereby rotating this tilt plate toward its axle. This rotation of the tilt plate towards its axle exerts a downward force on its associated carriage spring 84a and thus a portion of the upward thrust on the bogie 13 has now been transferred to the spring 84a on the adjacent bogie 13a.

*The bumper*

In FIG. 10 there is shown a detail of the bumper assembly 32 which, in its normal position hangs vertically at the rear of each of the main chassis 10. This bumper consists of a bumper bar 36 mounted across a pair of vertical supports 34, each containing an offset stopping plate section 35. The vertical supports 34 are fastened to a pivot bar 37 and can rotate with it. A force exerted against the bumper bar 36 from the rear is resisted because the stop plate section 35 is butted against a rear cross channel 31. However, force exerted on the bumper bar 36 from the front allows this to be tilted up into the position shown in broken lines in FIG. 10 and thus be out of the way when the extendible sub-chassis 17 is extended to the rear for coupling in a tandem arrangement.

The overall design of the chassis employs these three cooperating units to form a single module which can be used alone or coupled in a tandem arrangement. Changing the bogie position from the single to the tandem position can be done readily and safely, since the bogie 13 is always supported both horizontally and vertically on the side rails, either of its own sub-chassis or the sub-chassis of the rear unit in a tandem hook up.

While a particular detailed configuration of the chassis has been described, many modifications, alterations and improvements will now occur to those skilled in the art and the invention described herein should be construed as limited only by the spirit and scope of the appended claims.

What is claimed is:

1. A chassis module for use as a single trailer unit coupled to a highway tractor or as a tandem trailer when coupled in longitudinal alignment with an identical module comprising, a generally rectangular main chassis frame including means for supporting a container thereon, the front portion of said chassis frame being substantially reduced in the vertical dimension;

a king pin attached to and extending downwardly from the front portion of said chassis frame;

a generally rectangular sub-chassis frame, said main chassis frame being formed with longitudinally extending sliders, said sub-chassis frame being formed so that it can be slidably mounted on said main chassis sliders for positioning in a first position entirely within the longitudinal limits of said main chassis frame and in a second position rearwardly extended from said main chassis frame;

means for securing said sub-chassis frame in either said first or said second position;

a pair of guide prongs mounted on the lower rear portion of said sub-chassis for engaging the front portion of a second chassis when two of said chassis are coupled in tandem;

a king pin guide and latching means mounted on the upper rear portion of said sub-chassis frame;

and a single axle wheel bogie assembly slidably mounted within said sub-chassis frame.

2. A chassis module in accordance with claim 1 wherein said sub-chassis is formed with longitudinally extending sliders for slidably mounting said wheel bogie assembly within said sub-chassis, said wheel bogie assembly and said sliders being formed so that said wheel bogie assembly may be moved in a longitudinal direction along the entire length of said sliders with movement in any other direction constrained; and means for securing said wheel bogie assembly at a first station within said sub-chassis, said wheel bogie securing means including provision for mounting a second wheel bogie assembly at a second station in close juxtaposition to a wheel bogie in said first station, when two of said chassis are coupled in tandem.

3. A chassis module in accordance with claim 1 wherein said means of supporting a container thereon comprises first and second laterally extending bolsters mounted transverse to the longitudinally extending sliders on said main chassis frame, each of said bolsters being provided with means for securing a container thereto, said bolsters being positioned with respect to the ends of said main chassis frame such that when two of said modules are coupled as a tandem trailer, containers secured to the respective pairs of bolsters are sufficiently separated not to come in contact with one another.

4. A chassis in accordance with claim 1 wherein said main chassis is formed with a pair of longitudinally extending I beams as side members, the upper inner face of the bottom flange of each of said I beams serving as the longitudinally extending sliders of said main chassis, and wherein a pair of longitudinally extending I beams form sub-chassis side frame members, the separation between the vertical portions of said sub-chassis side member I beams being less than the separation between the inner edges of the bottom flanges of the main chassis side member I beams, said sub-chassis side members being formed with horizontally extending angle members, and phenolic slide pads mounted on the bottom horizontal surface of said angle members for providing a sliding surface.

5. A chassis module in accordance with claim 4 wherein said means for securing said sub-chassis frame comprises, a pair of locking pins horizontally mounted within said sub-chassis frame, spring members for urging said locking pins outwardly towards the sides of said sub-chassis frame, said sub-chassis frame being formed with openings in the side members thereof allowing said locking pins to pass therethrough, said main chassis frame being formed with openings in the side members thereof at spaced-apart longitudinal positions such that said locking pins extend through one pair of said openings when said sub-chassis is in said first position and through another pair of said openings when said sub-chassis is in said second position, and actuating means for retracting said locking pins inwardly from the openings in said main chassis frame side members to permit movement of said sub-chassis frame within said main chassis frame.

6. A chassis module in accordance with claim 2 wherein said sub-chassis frame is formed with a pair of longitudinally extending I beams as side members, the lower outer portions of said sub-chassis I beams serving as the longitudinally extending sliders, said wheel bogie assembly including a frame having horizontal and vertical bearing surfaces, said bearing surfaces being positioned, when said bogie assembly is mounted on said sub-chassis, so that said horizontal bearing surfaces bear against the bottom portion of said sub-chassis I beam flanges and said vertical bearing surfaces bear against the outer lower portion of said sub-chassis I beam vertical sections, thereby constraining movement of said wheel bogie assembly with respect to said sub-chassis frame in any direction but longitudinally along said sub-chassis frame.

7. A chassis module in accordance with claim 6 and further including, a U-shaped channel member extending longitudinally along the center line of said sub-chassis frame, said channel member being formed with its open side facing downwardly, a cover plate fastened to the open downward side of said channel member, said cover plate being formed with openings therein at longitudinally spaced points along said sub-chassis frame and wherein said means for securing said wheel bogie assembly comprises, a cylindrical locking pin mounted within said wheel bogie assembly, means for urging said cylindrical locking pin upwardly to protrude through the openings in said sub-chassis channel cover plate, actuating means for retracting said wheel bogie locking cylinder, thereby permitting said wheel bogie assembly to slide longitudinally with respect to said sub-chassis frame, and means for restraining said locking cylinder from upward motion until said wheel bogie assembly is positioned so that said locking cylinder is located under a selected opening in said cover plate.

8. A chassis module in accordance with claim 2 wherein said wheel bogie assembly comprises, front and rear hangers, first and second identical tilt plates, each of said first and second tilt plates being pivotally mounted on a respective one of said hangers, an axle supporting spring having one end pivotally fixed to one of said tilt plates and the other end pivotally fixed to the second one of said tilt plates, each of said tilt plates protruding beyond the ends of said hangers, said first and said second stations for mounting said wheel bogie assembly being positioned such that when a wheel bogie is mounted in each of said first and said second stations, the protruding portion of said front hanger tilt plate on the wheel bogie assembly at said first station and the protruding portion of said rear hanger tilt plate on the wheel bogie assembly at said second station are contiguous so that upward pressure exerted on the axle supporting spring of one of said bogie assemblies is transferred through the respective contiguous tilt plates to provide a load on the axle supporting spring of the other wheel bogie assembly.

9. A wheel bogie assembly for use in a chassis module comprising, a generally rectangular frame;

first and second hanger elements depending from one end of said rectangular frame and forming a front pair of hangers;

third and fourth hanger elements depending from the other end of said rectangular frame and forming a rear pair of hangers, each of said first, second, third and fourth hanger elements being substantially identical;

first, second, third and fourth identical tilt plates each pivotally mounted on a respective one of said hanger elements, each of said tilt plates protruding beyond the outer edge of its respective hanger;

a first carriage type spring having one end pivotally fixed to said first tilt plate and the other end pivotally fixed to said third tilt plate;

a second carriage type spring having one end pivotally fixed to said second tilt plate and the other end pivotally fixed to said fourth tilt plate;

and an axle supported by said first and said second carriage springs.

References Cited

UNITED STATES PATENTS

| | | | |
|---|---|---|---|
| 3,061,332 | 10/1962 | Goulden | 280—415 |
| 3,066,953 | 12/1962 | Chosy | 280—418 |
| 3,102,738 | 9/1963 | De Roshia | 280—415 |
| 3,108,822 | 10/1963 | Tantlinger et al. | 280—104.5 |
| 3,154,319 | 10/1964 | Martin | 280—104.5 |
| 3,163,306 | 12/1964 | Bennett et al. | 214—515 |
| 3,163,442 | 12/1964 | Bertolini | 280—104.5 |
| 3,184,251 | 5/1965 | Martin | 280—104.5 |
| 3,288,492 | 11/1966 | Stricker et al. | 280—415 |

LEO FRIAGLIA, *Primary Examiner.*